(12) United States Patent
Wright et al.

(10) Patent No.: US 6,351,822 B1
(45) Date of Patent: Feb. 26, 2002

(54) METHOD AND APPARATUS FOR REMAPPING READ ONLY MEMORY LOCATIONS

(75) Inventors: John Marc Wright, Campbell; John Chester Masiewicz, San Jose, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/469,937

(22) Filed: Dec. 21, 1999

Related U.S. Application Data

(60) Provisional application No. 60/123,001, filed on Mar. 5, 1999.

(51) Int. Cl.[7] ............................................... H02H 3/05
(52) U.S. Cl. ............................................................. 714/8
(58) Field of Search ........................................ 714/7, 8

(56) References Cited

U.S. PATENT DOCUMENTS

| | | | | |
|---|---|---|---|---|
| 4,542,453 A | * | 9/1985 | Patrick et al. | 364/200 |
| 5,493,674 A | * | 2/1996 | Mizutani et al. | 395/182.04 |
| 5,568,623 A | * | 10/1996 | Ogawa | 395/375 |
| 5,901,225 A | * | 5/1999 | Ireton et al. | 380/4 |
| 6,049,672 A | * | 4/2000 | Shiell et al. | 395/712 |
| 6,158,018 A | * | 12/2000 | Bernasconi et al. | 714/8 |

* cited by examiner

Primary Examiner—John A. Follansbee
(74) Attorney, Agent, or Firm—Shawn Dempster; Jennifer Buenzow; Kirk Cesari

(57) ABSTRACT

In a computer data storage system configured for patching Read Only Memory (ROM) by remapping data sections, the ROM containing a token to define the start of each one of the data sections and a patch existing for at least one of the data sections, the patch providing additional data at the start of the data section; whereby the patch is included in one of the data sections when an access to one of the data sections is initiated at the token. The patch further optionally replaces at least a part of one of the data sections. The patch may be in writeable memory and if so, the ROM appears writeable thereby. The indicator will normally be a software No Operation or non-destructive instructive, since a No Operation instruction (NOP) causes a one cycle pause in the processor and allows time for the patch to be smoothly integrated.

8 Claims, 5 Drawing Sheets

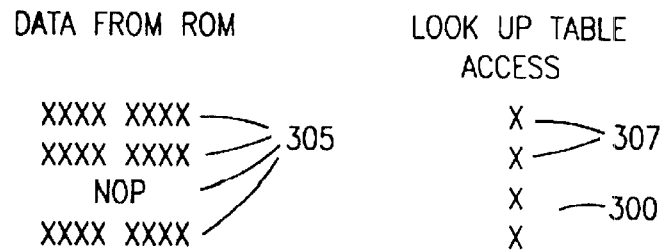
PRIOR ART FIG. 3-1
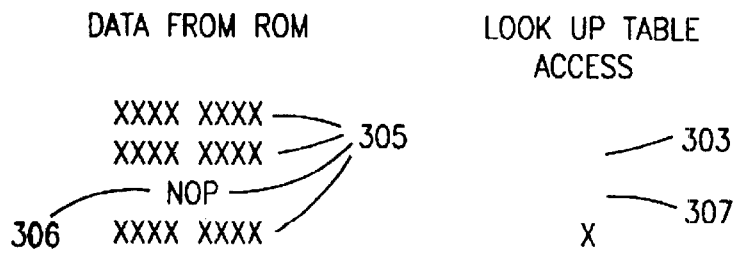
FIG. 3-2
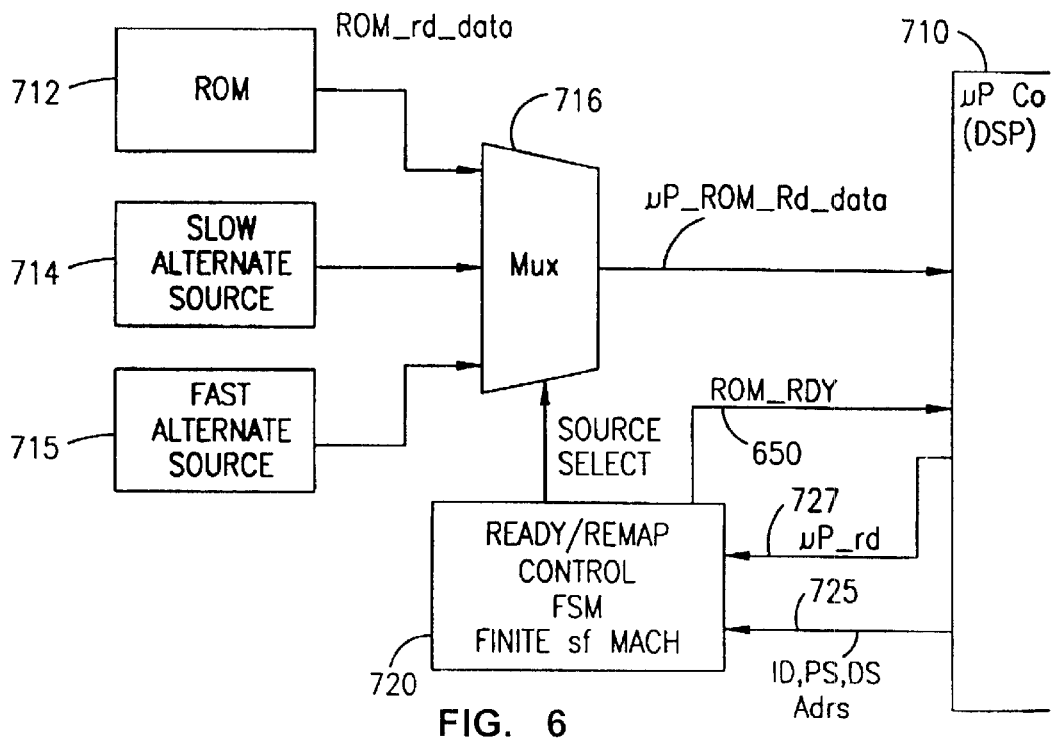
FIG. 6

METHOD AND APPARATUS FOR REMAPPING READ ONLY MEMORY LOCATIONS

CROSS-REFERENCE TO RELATED APPLICATION

This application claims priority to Provisional Application Ser. No. 60/123,001 filed Mar. 5, 1999.

FIELD OF THE INVENTION

The present invention relates generally to remapping computer data. More particularly the present invention relates to remapping read-only memory.

BACKGROUND OF THE INVENTION

In Read Only Memory (ROM) configurations, it is frequently desired to modify the ROM; i. e., a damaged area of the ROM may be repaired thereby, or changes to the data stored on said ROM such as upgrades or changes to eliminate "bugs" may need to be made without replacing the ROM.

In order to modify the ROM, the area to be modified must be defined in some way. Historically, the address at which a patch is to be substituted is stored in a table, and the table is consulted whenever a ROM access is made to determine if a patch exists for that address of the ROM.

Testing each address of the ROM as discussed above works well with relatively few patches, such as in a system with a lightly loaded central processor, where accessing the table has little impact on performance. However, using a lookup table to determine whether a patch is needed can be a significant problem when many patches on a large system are associated with a busy processor; or high-speed, where latency becomes an issue, and performance can be significantly impacted thereby.

Another problem is that when a small part of a ROM is damaged or includes errors or "bugs", the section to be patched may constitute one or more pieces of a routine; that is, a defined task with specific steps to be accomplished. Because patches may be randomly distributed, performance may become indeterminate due to the need to incorporate the patches. Critical scheduling such as for "real time" applications, may be jeopardized by patches. Prior art also utilized remapping mechanisms which utilized a table based upon an earlier instruction match to gain time for remapping. Those schemes require sequential execution of instructions. The current invention overcomes this restriction and other disadvantages of the prior art.

SUMMARY OF THE INVENTION

First some definitions that are useful in understanding the following description of the invention are provided.

As used herein and generally, when software is originated or revised, the software may be treated as "data segments" in which meaningful pieces of code (software) may be defined, just as in normal writing, paragraphs are defined (or chapters, etc.). This results in advantageous places for placing markers, something like "bookmarks". With normal paragraphs, a tab is often used; with software code, a subroutine name is created. Just as in writing text, the tab (or subroutine name) has no special meaning, but is inserted because it may be helpful. In the present invention, the subroutine name is used in just that way, to identify an enabler segment beginning, just as a tab may be used to identify a paragraph beginning and further for remapping purposes. Like a tab at the beginning of a paragraph, a token may be placed at each or any subroutine beginning, not to identify a beginning, but merely an alert that signals a data segment may be remapped there without penalty. This token may be a No Operation (NOP) instruction, or may be any instruction whose execution is non-destructive, or non-functional, e.g. a READ instruction. A READ instruction, in most applications, fetches data to the processor, but by itself, causes no action.

When a data segment is initially created, or when existing data segments are revised, such as a data segment for which patching in accordance with the present invention may be desired, entry points may be advantageously included. As an example, the initial boundary of a subroutine might be defined; where the subroutine is both an integral part of one routine, and simultaneously a callable subroutine for a second routine; or have some other significance as an advantageous place for initiating a routine; a token, such as a software No Operation (NOP), is placed in the data. Note that it is generally accepted in the art that instructions as well as information are lumped together generically as "data"; so a NOP, which is technically an instruction similar to a one cycle "pause" command, is referred to herein as "data". A NOP is advantageous for remapping because, in addition to acting as a token, a NOP idles the machine for one cycle.

In the present invention, the machine has instruction fetches located by instruction address, such as in its operating system (OS), that instruct the machine to refer to a lookup table on encountering each instruction address. As directed by a lookup table or other means, the instruction fetch can then be redirected to an alternate source rather than the original source ROM. This can be especially advantageous if the alternate source is re-writeable, since a ROM chip can be saved by branching around a defective section or to an alternate program path.

The present invented method enables remapping to work successfully with microcontrollers and microprocessors which fetch instructions within a single clock cycle.

The method of the present invention enables remapping to work with microcontrollers which operate at high speed to fetch and preferably fetch and execute instructions within a single clock cycle. The present method includes using a target pointer which does not remap the current access, but forces a slower fetch on the next subsequent access upon lookup detection of a branch to a remapped data section. It should be noted that the instruction (i.e. the token) is executed, which differentiates this design. This enables remap on extremely fast devices which go through a single cycle too quickly to enable both the detection of the existence of the remap branch and continue the program execution in a single cycle, while also advising the processor of a "Remapped" subsequent access in time for execution.

The present method includes using a non-destructive instruction, e.g. NOP, as the first instruction of a routine or callable subroutine to provide additional latency for a remapping match hardware to provide alternate remapped data. The method further entails allowing the next instruction after the NOP (i.e. the first "remapped" instruction) to be executed in an equally fast or a slow mode as determined by the remapping hardware pointing to the first location to be remapped. This allows for placing the remapping pointer in only one place, i.e. at or immediately preceding a NOP instruction or other non-destructive instruction. This also allows multi-way entry into the routine, i.e. this allows entering the fetch routine for the remapped data from multiple places, without the requirement of knowing the previous fetch address. At the end of the patch which is brought in by this sequence, an instruction such as a jump or branch returns the data flow to the original code stream so that only an entry point as discussed above need be placed in the data to exercise the present method. It should be noted, that some code patches may not return to their point of origin, and depending on the code patch, make execute an entirely new program.

In setting up the ROM, the token instructions are placed at the beginning of routines or subroutines comprising data which are identified as being so far unproven, and posing a risk of including a bug. According to the present invention, after testing of the disc drive which includes this ROM, upon detection that in fact a bug does occur in some routine following a NOP instruction, then the necessary address to be detected by a comparator during or immediately preceding the NOP instruction will provide the data needed to branch to the remapped data as stored in a fast or slow alternate source.

The present invention provides the ability to map out a section of memory on a device which is extremely fast to an alternate source memory which may be equally fast, or otherwise to another memory which may be substantially slower.

In fact, the present invention, would allow the use of mapping from memory to a multiple of locations, some fast, some remapped data being stored in a fast alternate source memory, some remapped data being stored in a slow alternate memory. The remapping of a fast single-cycle execution processor to an equally fast remapped memory is a key advantage of this design, as is the use of fast or slower alternate sources.

In a useful variation, the token only needs to be inserted before the start of a risky routine having a destructive instruction; in other cases where a nondestructive first instruction is used, this could provide the extra cycle needed to read the branch to the remapped data. Other features and advantages of the present invention will become apparent to a person of skill in the art who studies the present invention disclosure given in conjunction with the following drawings.

BRIEF DESCRIPTION OF THE DRAWINGS

FIG. 3-1 and FIG. 3-2 are idealizations of software segments wherein an embodiment of the invention in FIG. 3-2 is compared to the prior art in FIG. 3-1.

FIG. 6 is a block diagram of some primary element of the invention.

DETAILED DESCRIPTION

Figure 1:
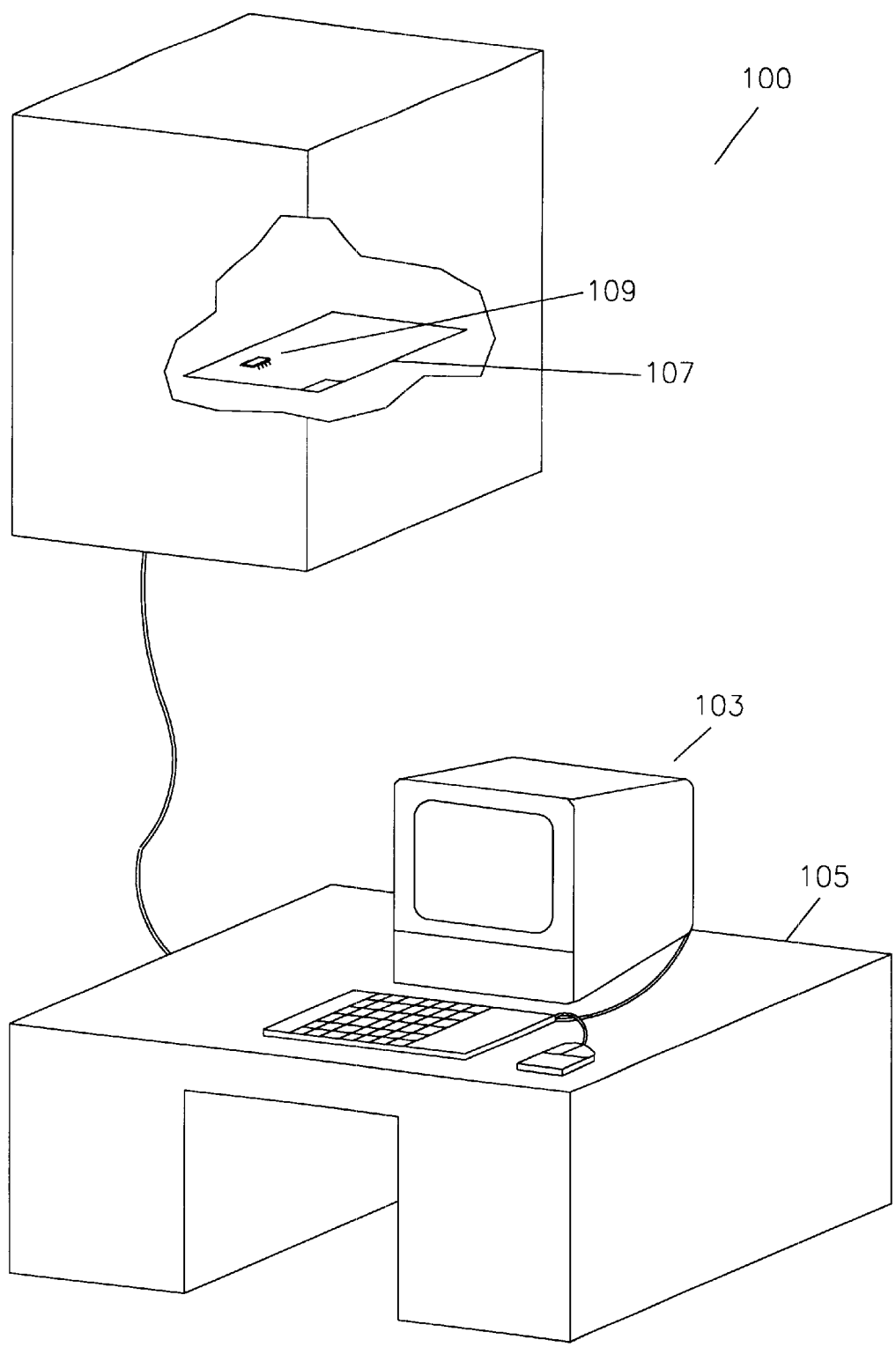
FIG. 1 is an isometric view of a computer system which incorporates the present invention.
Figure 2:
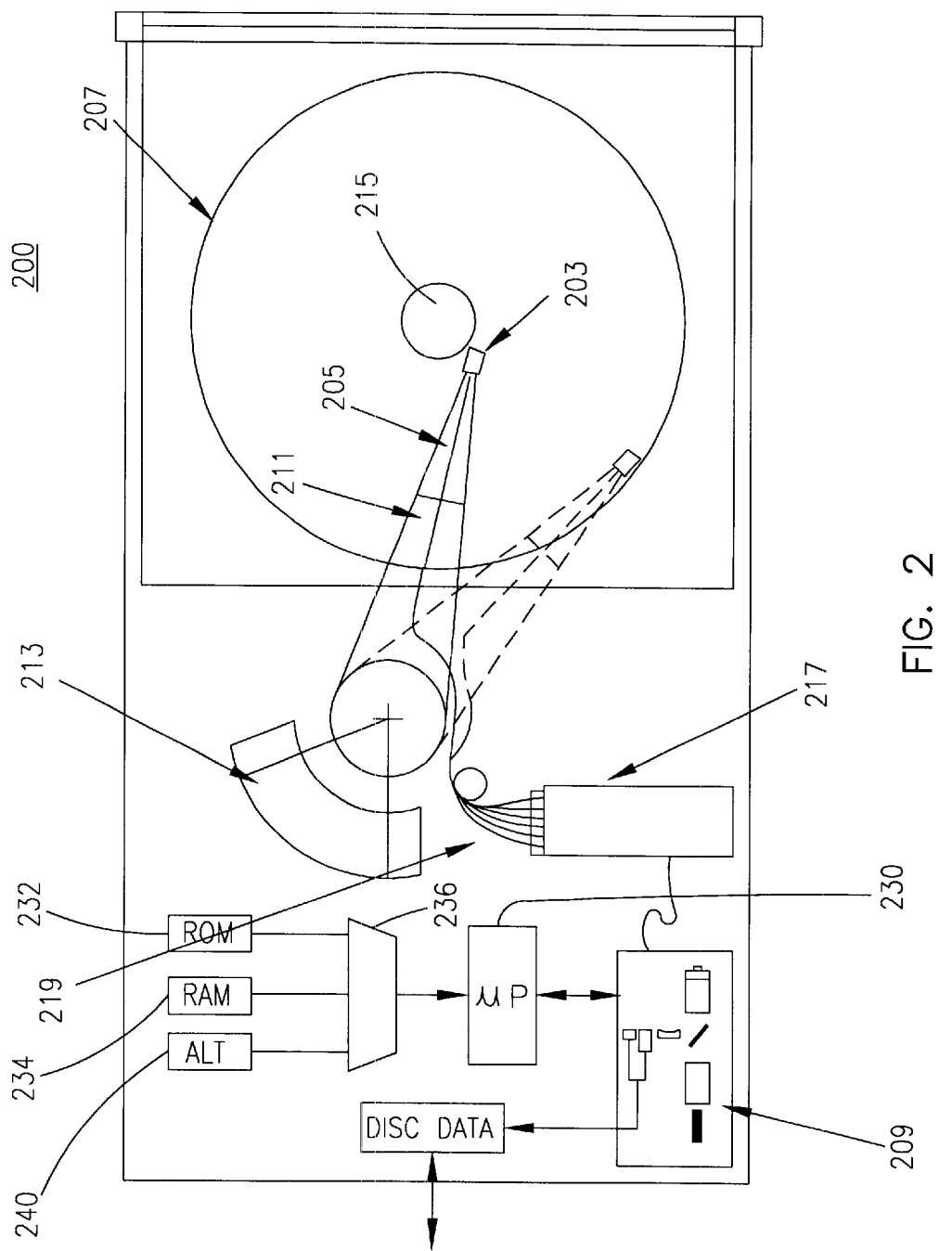
FIG. 2 is a plan view of a writeable storage device, a disk drive, which might be connected to the computer system of FIG. 1.

In the embodiment of a computing system 100 including a state machine for controlling the execution of instructions 103 of both the prior art and the invention shown in FIG. 1, a desk 105 provides data entry means 107, which include, for example, a monitor, keyboard, cursor controlling device, and other interface devices. Computer system 100 has multiple ROMs 109, controlling functions such as the monitor, operating system (OS) ROMs for providing booting instruction fetches, etc. The ROMs 109 in computing system 100 often require patching to improve performance or eliminate bugs from unproven ROMs, or if a ROM is damaged, for bridging over the damaged section without loss of the data ROM. In this embodiment, a patch may be provided in some media, such as the writeable media, whereby additional changes may be easily incorporated. Also, the patch may be placed in a larger storage area than the area allotted on the ROM so that the data may be expanded. While the present invention may be useful in any such ROMs, it is especially useful in a disc drive such as shown in FIG. 2. Such drives operate at any high speed and typically incorporate a Microprocessor or DSP (digital signal processor) utilizing a single, brief cycle to read and execute each instruction. Such disc drives typically use an on-board ROM to store the required data for operations. Such disc drives are made in high volumes to minimize cost. Therefore some provision must be made for patching "buggy" sub-routines in the on-board ROMs to avoid the potential for expensive rework which would require physical replacement of the DSP and its ROM. The subject invention also allows for "field upgrade" of the software in the ROM. That is, some software subroutines in the original ROM may need updating to accommodate new approaches, standards or the like, even though they are not erroneous. The method described herein can be used to install the upgrade, avoiding replacement of the ROM.

In the read/write system of FIG. 2 200, a disc drive is shown including one or a multiplicity of read/write heads 203 supported and moved from location to location by a multiplicity of actuator arms 205 attached to support 211. Support 211 is driven by actuator drive 213 across a multiplicity of disks 207 rotating on hub 215. The signals read from the disc are carried by connections 219 to be processed by read/write circuitry 209 through head switching circuitry 217 as data to and from a computing system (FIG. 2). These commands and data are processed through an on-board microprocessor 230 which accesses ROM 232 and RAM 234 for its instructions and data through multiplexer 236. In the event that a defective subroutine is found in ROM 232, then rather than replace that ROM, patch data is supplied from alternate source 240. This alternate source may be within the microprocessor or other ASIC embodied memory, but is slower externally for simplicity. This alternate source may be within the microprocessor or other ASIC embedded memory, but is shown external for simplicity. When patch data is required, it may be taken from alternate source 240 provided in the computer system as shown in FIG. 2, which may be either a fast or slow data store as shown.

The purpose of this feature is to be able to redirect a microprocessor instruction fetch from its original source ROM, to be sourced from one of a number of alternate sources. The advantages of this feature are the following:

If the alternate source is rewritable this will provide a means of saving a ROM based chip by placing a branch instruction in the alternate rewritable source. The Rewritable source may be a small or large on-chip or small or large off-chip source.

If the ROM firmware contains a non-destructive instruction, e.g. NOP, at the beginning of a routine that may need patching, and possibly also before each small task within the routine, it gives the firmware designer the option to later circumvent a routine or a task using the remap feature.

The NOP (non-destructive instruction) is provided for the remap logic to allow time for detection of the remap location and to subsequently deassert the ROM-RDY signal to cause the microprocessor to be throttled (wait until the new data is assessed) on the next instruction. This next instruction, which would be the first instruction of the patch, can then be brought in from an alternate source; for that alternate source, the cycle timing can be controlled by the remap control logic 720. This alternate timing may be Fast or Slow. Also, the last instruction of the patch would typically cause return to the data stream of the DSP's on board ROM.

As noted above, a typical data set of the prior art is shown in FIG. 3-1 and comprises a set of data entries 305. According to the processes used throughout the prior art, and typically used with slower processing machines, each data entry in data entries 305 is read, decoded, and compared to a remap file stored in a lookup table or equivalent. If a hit is recognized, then the state of the ready line or equivalent signal line is changed and held to allow additional time to bring in the alternate data and place it in the stream where data normally comes from in time to be executed after which the normal operating state of the ready line may be restored. Clearly, with an extremely high speed processor of the type with which this invention is useful, the time for execution of all of these steps is not available. If, in a high speed processor, every data entry was tested and compared to a lookup table to determine if a patch must be called up, additional overhead would be involved with a significant impact on system performance. This is typically why prior art relies on READY deassertion and a slower remapped data source.

According to the present invention as briefly indicated at FIG. 3-2, testing for a patch occurs at every data access, and if a match is made, the execution of the subsequent instruction, a NOP or other non-destructive instruction, allows time for the remapping hardware to detect the compare and substitute the new data source to the processor. In the prior art, there is not sufficient time to do the necessary comparisons and disability of Ready within one single clock cycle, particularly when the cycle execution time is less than 20 nS. Such instructions are stored in the ROM periodically when the entire data set of the ROM is stored. Such a NOP instruction is stored at the introduction to those subroutines which have been identified in advance as likely to cause a problem or present a difficulty, or which have not been fully tested in the use of a disc drive, and may therefore require revision by means of a replacement "patch." NOP instructions are not required unless the first instruction of the subroutine is identified as destructive.

Thus, the prior art lookup table must be accessed while processing each piece of data, and if the lookup table indicates that in fact access to a patch is required, the ready line must be placed in a disabled state to allow time for accessing the patch, all of which takes up processing time and slows the processor considerably, as shown generally in FIG. 3-1. With the current invention, the lookup table is still compared while processing each piece of data, but the Ready line does not need to be disabled within one cycle to remap defective data, and similarly the remapped data, after the NOP instruction can run at single-cycle speeds.

It should be noted that in the event of significantly faster microprocessors, a multiple of NOP's can be inserted instead of just one, thereby allowing additional hardware detection time while still operating the processor in single-cycle execution.

Figure 4:
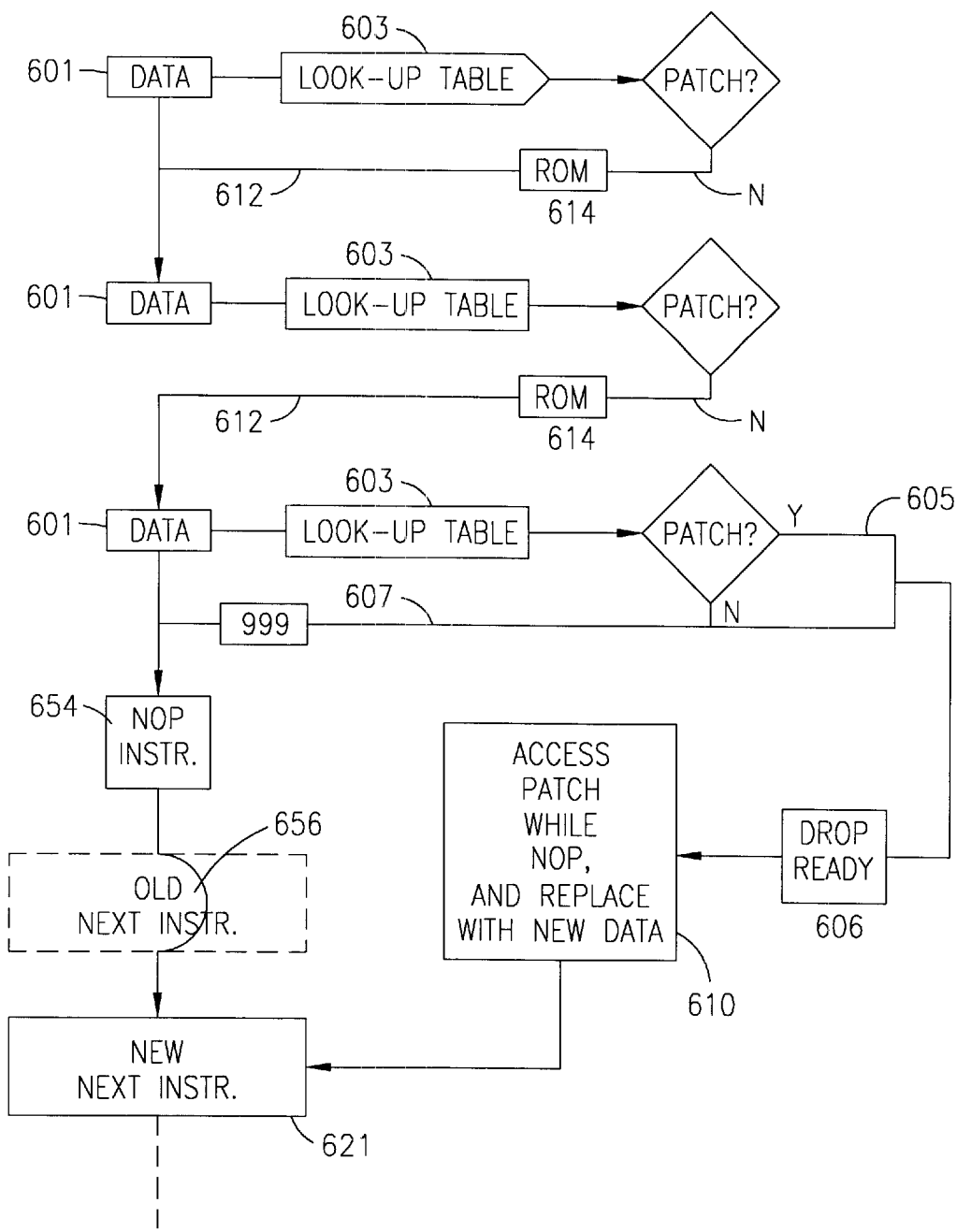
FIG. 4 is a flowchart of the basic operating sequence of the invention.

According to the present invention, as shown in FIG. 3-2, (and FIG. 4) it is only necessary to change the state of the READY line following accessing the lookup table and a determination that a patch must be accessed. As shown in FIG. 4, the NOP 654 allows time for the READY line to change state. The execution time of the next instruction after the NOP is then extended to allow time to access the patch. This extension is only required if the remapped memory is slower than is necessary to operate in single-cycle mode.

According to the present invention, and as can be seen in the flow chart of FIG. 4 of the present application, the lookup table 603 is regularly accessed at the time each instruction (data) 601 is accessed and executed. During the execution of instructions, if the lookup table 603 indicates that a patch is desired 605, then the READY line is deasserted 606. Simultaneously 607, the next instruction 654 (NOP) is called from ROM 614 and executed without functional impact or destruction of any data. During execution of NOP instruction 654 the patch is accessed 610. When the NOP ends, the new next instruction 621 (which is a part of the patch) is executed and the old next instruction or instructions 656 which are a part of the deleted sequence are skipped over.

If a patch is not to be executed 612, then the primary ROM is again accessed 614, and data 601 is sequentially removed from the ROM 614. In considering this invention, note that it is extremely important to maintain the sequence of operations to the maximum extent possible, controlled by the onboard ROM 614 which is either tightly tied to or integrated with the processor. The high speed single cycle processors with which this invention is useful must be able to access their enabling data quickly. Any access to external memory immediately inhibits the performance, in terms of speed, of the overall design. Further, the use of such external memory, if large in size, or fast, is an unacceptable increment in the cost of the overall design.

Before moving onto the further discussion of the invention, it should be noted in the flow chart of FIG. 4 that when execution of the patch is completed, in the preferred approach an exit from the patch back to the normal data stream is provided within the patch utilizing, for example, a branch back to the code in ROM. It should further be noted that by utilizing the present invention, access to the subroutine can be from any point in the program, whether a sequential execution, a branch, or the like. Further, the present approach allows almost all of the execution of the software of the invention to be directly from the onboard ROM in the microprocessor, which is extremely cost-effective to implement and operate at the maximum possible speed.

Figure 5:
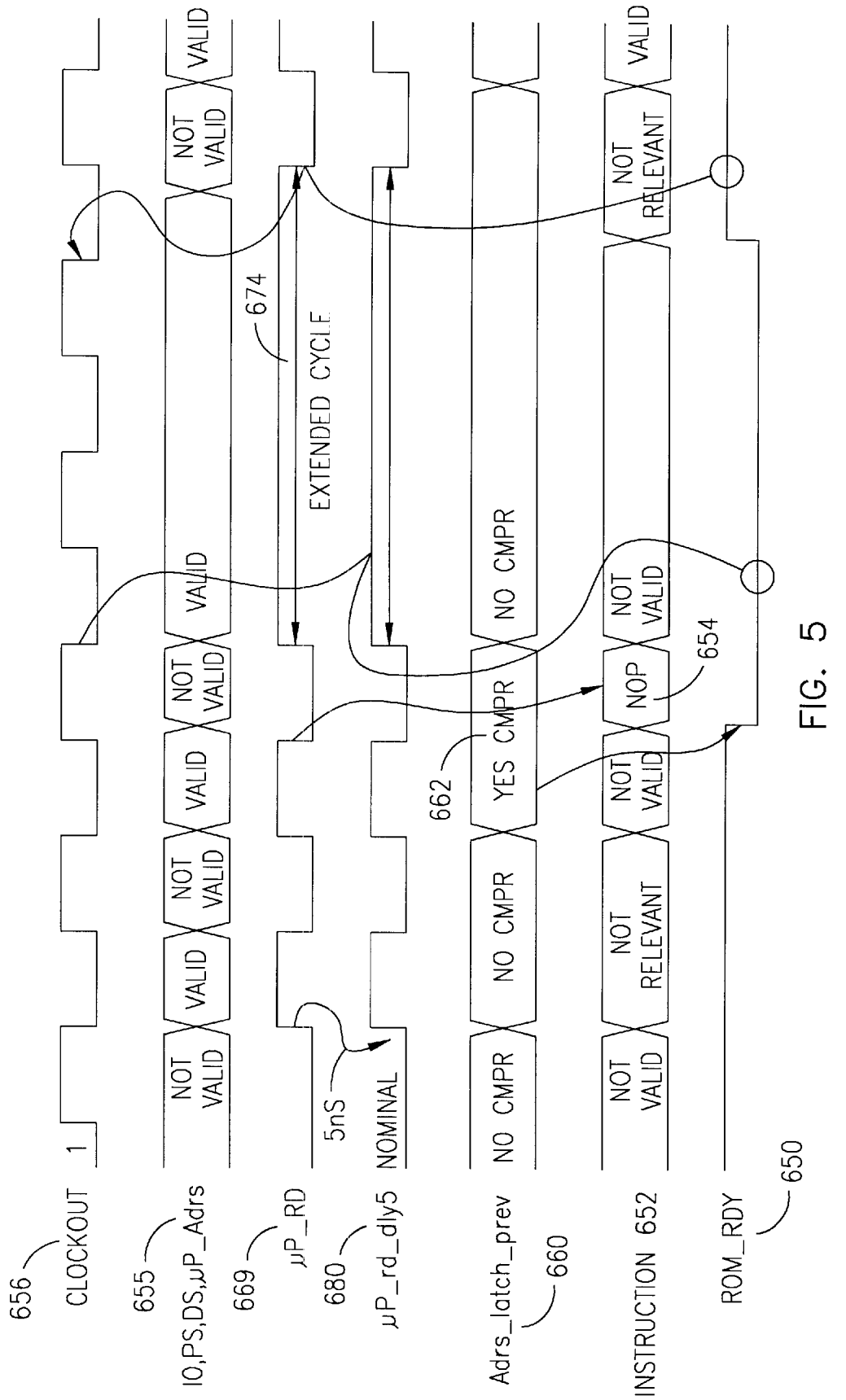
FIG. 5 is a timing diagram of primary steps of the invention.

Referring next to FIGS. 5 and 6, FIG. 6 shows the primary units of the microprocessor and associated memory which are called into play to implement this invention. They include the high-speed digital signal processor or microprocessor 710 which receives, in the normal course of events, its instructions and data from the on board ROM 712 over the line marked line 713 through the multiplexer (mux) 716. The operation of the microprocessor and specifically with respect to the remap function, is controlled by the finite state machine 720 which can easily be designed by a person of skill in the art who reads this disclosure and looks at the exemplary timing diagram of FIG. 6. One output of the state machine 720 is simply a ROM READY line 650 which as it appears in FIG. 5 is normally high when data is being received from the ROM 712 through multiplexer 716. This READY line 650 goes low, briefly stalling microprocessor execution when required to do so because a patch must be read from one of alternate sources 714, 715. It can be seen that the inputs to this microprocessor include the lines IO, PS, DS, and μP_Adrs, a plurality of lines generally indicated at 725 in FIG. 6, whose timing is represented at line 655 of the timing diagram and is controlled by the timing of the clock line 656. The μP__RD line 727 normally operates synchronously with the clock 656, but also has an extended cycle 670 as shown at line 669, once a YES CMPR 662 is found.

Reviewing the signal lines in FIG. 5, the top line clockout1 656 is simply a clock signal, which controls timing of all operations of the microprocessor. The next succeeding line 655 indicates the timing of the transfer of the input-output IO, the processor select PS, the data select DS, and the microprocessor address μP__Adrs, with the timing coinciding with the changes of state of the clock. It will be seen that these signals, as well as most of the succeeding signals, take on an extended cycle when the ROM__RDY 650 line is false, which occurs in response to a YES CMPR determination 662. The YES CMPR signal exists whenever a positive match exists between the instruction address being read and a patch indication or address 307 stored in a lookup table. When the comparison is positive, the presence of a non-execution instruction NOP allows time for the RDY line 650 to change state, extending the cycle of all associated signals in FIG. 5.

To see how this comes about, the microprocessor read μP__RD 669, changes state regularly with the same timing as the clock signal, unless an extended cycle 674 is also established. A read delay signal μP__rd__dly5 680 is also established; this small delay relative to μP__RD 669 is sufficient time for a comparison to occur between the data or instruction being read as shown in FIG. 3-1 and 3-2 and the address stored in a lookup table. As shown in FIG. 5 at lines 660, the comparison will in most cases be false, indicating that no patch has been stored. However, if a Yes CMPR occurs, 662, then when the instruction is a NOP, 654, at the coincidence of these two events, on the next trailing edge of the microprocessor read signal 669, the ROM ready signal ROM__RDY 650 changes state. At the next trailing edge of the clock signal clockout1 656, the μP__RD microprocessor read signal 669 and its coordinated signal μP__rd__dly5 680 both switch to an extended cycle as well as the signals at lines 655 and 652 and 660. This extended cycle timing is maintained until a preset time which is sufficient to allow for a transfer in from or access to a patch from alternate source 715 or 714 has occurred, after which the ROM ready signal ROM__RDY 650 again changes state back to its normal operating state. At this time, on the next trailing edge of the clock signal clockout1 656, when the ROM__RDY 650 signal is again inspected, since it has returned to its normal operating state, the extended cycle terminates and the normal, very high speed single cycle operation of the microprocessor 710 resumes.

It should be noted that by using this sequence, either fast or slow alternate sources 715, 714 can be used to store the patches as the timing of the transfer of the patch from alternate sources 715, 714 can be controlled by state machine 720.

In summary, the purpose of this feature is to be able to redirect a microprocessor instruction fetch from its original source ROM, to be sourced from one of a number of alternate sources. The advantages of this feature include the following:

If the alternate source is rewriteable this will provide a means of saving a ROM based chip by placing a branch instruction in the alternate rewriteable source.

By allowing the ROM firmware to contain a NOP instruction at the beginning of each routine, and also before each small task within the routine, it gives the firmware designer the option to later circumvent a routine or a task using the remap feature. This is only necessary if first instruction is destructive. The NOP instruction is utilized by the remap logic to allow time for detection of the remap location and to subsequently deassert the ROM__RDY signal to cause the microprocessor to be throttled on the next instruction. This next instruction can then be redirected from an alternate source of which the cycle timing can be controlled by the remap control logic 720.

In fact, some patches could be stored in a fast alternate source, and others in a slow alternate source, with appropriate timing signals being provided by accessing instructions in the same source and in the state machine 720.

SUMMARY OF THE CLAIMS

In summary, the present invention can be described as a computer data storage system 100 configured for patching Read Only Memory (ROM) 109 by remapping data sections with a ROM containing a token to define a start of the data sections.

If a patch providing additional data for the one the data sections is desired, a remap control state machine 103 includes the patch in the one the data sections when an access is initiated at the token, the patch being included at a next instruction after the token. The preferred token is a software NOP.

If a writable memory for storing the patch is used, the ROM 109 will appear writeable to enable interactive patch revisions. The patch may be larger than the data section replaced by the patch. The patch is used for maintaining the processing speed of very fast single cycle machines; the patch may be stored in either a faster 715 or slower 714 alternate source.

A computer data storage system 100 means has elements comprising at least one Read Only Memory (ROM) 109 storing data for an associated microprocessor, with data in the form of one or more sequences that may be targeted for replacement and the ROM 109 containing a token to denote the start of each the targeted sequences. A patch is defined for augmenting or replacing one the sequences as well as a remap control finite state machine for detection of the token for replacing one the sequences with the patch. The state machine reads a table to determine the presence of the patch to replace the targeted sequence responsive to the token to cause a next instruction following the token to initiate transfer and execution of the patch. The token may be a software NOP controlling a non-execution cycle. Also, the patch for augmenting the data storage means may be in writeable memory, so that the ROM appears writeable for interactive modification of the patch. Alternatively, the patch for augmenting the data storage means may be in read only memory. The patch may be larger than the data section.

The patches may be stored in relatively slow alternate memory 714 and or in relatively fast alternate memory 715. The computer may be a single-cycle microprocessor for executing an instruction during each cycle, including a method for remapping one or more data sections of data stored in the ROM 109, if the original data sections contain an error.

The patching involves storing a token at the start of any one of the sections optionally requiring a patch, comparing data read from the ROM 109 with a list of remapping data sections, and extending the execution of one of the instructions for one cycle so the system can accept the patch. The token may be a software NOP whereby a nonexecution cycle is introduced so that external inputs may be serviced or may be any non-destructive instruction. Also, the patch may be in writeable memory, so that the ROM 109 appears writeable, or the patch may be in read only memory. The patch may be larger than the data section.

Other alternatives to the present design disclosed herein may be within the skill of the art and apparent to a person who studies this disclosure. For example, another token rather than a NOP might be used if real time or similar operations that could benefit from the NOP were used. Further, an implied token might be used without departing from the spirit of the invention. Therefore, the scope of the present invention is to be limited only by the following claims.

What is claimed is:

1. A computer data storage system comprising at least one Read Only Memory (ROM) for storing data routines for an associated microprocessor, an alternate memory source comprising one or more patch sequences that may be targeted by a state means for execution in place of or supplementing one of the data routines in the ROM, the ROM containing a token for denoting a starting point of each of the data routines which may be replaced or supplemented, and the state means causing a fetch of one of the patch sequences responsive to detection and comparison of an instruction address preceding the token with a lookup table in the computer data storage system.

2. The computer data storage system as claimed in claim 1 wherein the state means includes a table for indicating a presence of one of the patch sequences to be executed, said state means responsive to the table to initiate branch to or execution of the patch sequence during the execution of the token.

3. The computer data storage system of claim 2 wherein the patch sequence is fetched from a writeable memory by the state means, so that the ROM appears writeable to the computer data storage system.

4. The computer data storage system of claim 2 wherein the state means responds to detection of the token to extend an execution cycle of a next following instruction to allow time for access and beginning execution of the patch.

5. The computer data storage system of claim 2 wherein the patch sequence is larger than the data routine being replaced or supplemented.

6. The computer data storage system of claim 1 wherein the token is at least one software No Operation (NOP) or non-destructive instruction controlling at least a non-execution cycle.

7. The computer data storage system of claim 1 wherein the token includes any non-destructive instruction including a read instruction or a NOP instruction.

8. The computer data storage system of claim 1 wherein the computer data storage system is a single-cycle microprocessor for executing an instruction during each cycle.

* * * * *